Figure 1:
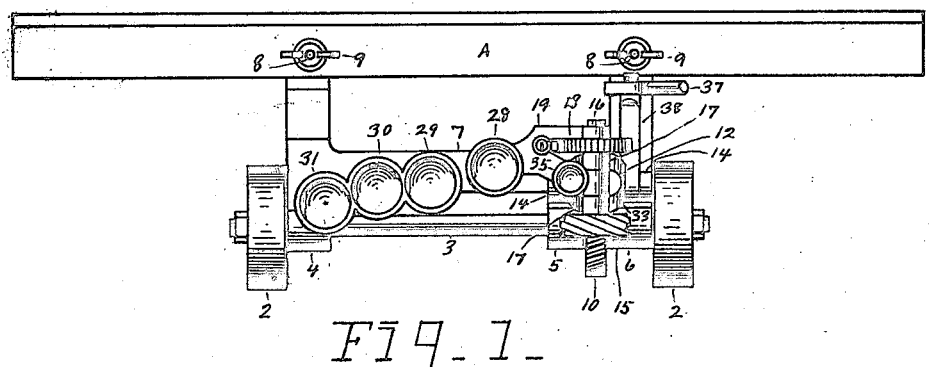
Figure 2:
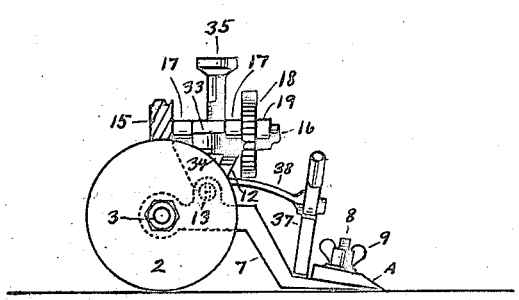
Figure 3:
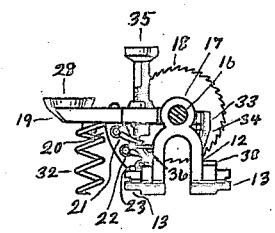
Figure 4:
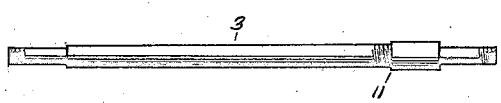
Figure 5:
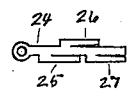
Figure 6:
Figure 7:

H. O. EIANE.
DRAFTING INSTRUMENT.
APPLICATION FILED APR. 23, 1919.

1,435,893.

Patented Nov. 14, 1922.

Witnesses
Ingrid Espedal.
Bertha Espedal

Inventor
Halvor Olsen Eiane

Patented Nov. 14, 1922.

1,435,893

UNITED STATES PATENT OFFICE.

HALVOR OLSEN EIANE, OF DETROIT HARBOR, WISCONSIN.

DRAFTING INSTRUMENT.

Application filed April 23, 1919. Serial No. 292,226.

*To all whom it may concern:*

Be it known that I, HALVOR OLSEN EIANE, a citizen of the United States, residing at Detroit Harbor, in the county of Door and State of Wisconsin, have invented a new and useful Drafting Instrument, of which the following is a specification.

My invention relates to improvements in a drafting instrument in which the chief objects are; first, to provide an instrument by which equally spaced parallel lines may be obtained by means of a lever manipulated gear-mechanism turning a pair of running wheels to which a straight-edge is secured through a suitable frame; second, to obtain irregular spaced paralleled lines, by disengaging the lever manipulated gear-arrangement from the running wheels, and moving the instrument direct by hand at will of operator.

I attain these objects by the use of an instrument hereinafter more fully described and claimed having reference to the accompanying drawings, in which Figure "1," represents a top view of the instrument. Figure "2," represents a view from the right-hand side of the instrument. Figure "3," shows the action lever, and ratchet gear in its bearing support. Figure "4," represents a side view of the wheel axle. Figure "5," represents the flat side of the branched pawl spring as it appears when cut from a metal sheet. Figure "6," represents an edge view of the pawl springs, when bent into proper shape. Figure "7," represents a forked pawl, viewed from the side which stands out from the ratchet gear.

"A," in Figure "1," is a straight-edge. The running wheels "2," and "2," are secured fast to the axle "3," which runs through suitable bearings "4," "5," and "6," in the frame "7." The straight-edge "A," is secured to the frame "7," by a pair of screw-studs "8," and "8," which are permanently secured by its lower ends to the frame "7," and are provided with a pair of thumb nuts "9," and "9." The gear "10," is secured to the axle "3," by being screwed up to the shoulder "11," on said axle. The bearing support "12" is hinged to the frame "7," by the screw pins "13," and "13," which pass through the lugs "14," and "14." The gear "15," turns the gear "10," and is permanently secured to the shaft "16," which turns in the bearings "17," and "17," and carries on its opposite end a ratchet gear "18," which is secured to the shaft "16," by being screwed up to a shoulder on said shaft, in the same manner as the gear "10," is secured to the axle "3." The lever "19," is pivoted on the shaft "16," and is provided with a sector "20," which carry the pawls "21," "22," and "23." The pawls are adjusted in the following manners: When for instance the pawl "21," engages a tooth in the ratchet gear "18," the pawls "22," and "23," stand in positions of one third, and two thirds, down in the ratchet teeth, respectively; such that a movement of the lever "19," corresponding to one third of a tooth will cause one of the pawls to catch hold in a tooth. A spring "24," with branches "25," "26," and "27," is placed on the inner surface of the sector "20," and presses the pawls "21," "22," and "23," against the teeth in the ratchet gear "18." The spring "24," as shown in Figure "5," is made in one piece, the branches "25," "26," and "27," are laid in over the center and bent into shape, as shown in Figure "6."

The instrument is operated as follows: The index finger of the left hand is placed in the socket or button "28," on the lever "19," and the other fingers of the hand are placed in the sockets "29," "30," and "31," which are attached to the frame "7," now by pressing on the lever "19," the motion is transmitted through the gears and shafts described, to the running wheels "2," and "2," which cause the instrument to move a little in the direction toward the operator, and a line may then be drawn with a pen in the right hand; and the spring "32," raises the lever "19," to the starting point again, ready for the next operation.

An extension "33," on the lever "19," rest on a projection or lug "24," which is integral with the bearing support "12," and serves as an upward stop for the lever "19." An adjusting screw "35," which strikes against the lug "36," regulates the movement of the lever "19," and consequently the movement of the whole instrument, under each press of the lever "19." The adjusting screw "35," may be split lengthwise and widened out slightly in order to cause the necessary friction in the threads, under tension.

When paralleled lines with irregular spaces between, are desired, the cam-shaped lock-lever "37," which is attached by screw threads to the spring "38," can be thrown out, and thus disengage the gear "15," from the gear "10"; and the instrument can then be moved direct by hand at will of operator, without the aid of the lever "19."

The spring "38," which is integral with the bearing support "12," also serves to keep the gear "15," under constant pressure against the gear "10," when the lock-lever "37," is thrown in, in order to counteract the tendency of the pawls to move backward the ratchet gear "18," when the lever "19," is moving upward. The running wheels "2," and "2," will be rubber tired, so as not to slip on the drawing paper; and considerable downward pressure by the hand moving the instrument must be exerted, in order to get the best results. Suitable casings may be placed over the gear-arrangement.

Having thus described my invention what I claim and desire to secure by Letters Patent is:

1. In a drafting instrument, the combination of a shaft having rollers secured to its opposite ends, a frame pivoted to said shaft, a straight edge fixed to said frame, a second frame pivotally mounted on the first frame, a shaft pivoted in said second frame and extending over the first named shaft, and means including gearing connecting the two shafts for imparting intermittent rotary movement to the first named shaft.

2. In a drafting instrument, the combination of a shaft having rollers secured to its opposite ends, a frame and straight edge pivoted to said shaft, a second frame pivotally mounted on the first frame, a second shaft rotatably fitted in said second frame and in a transverse relation to said first named shaft, a helical gear fixed to said first named shaft, a second gear meshing with the first gear and fixed to the end of said second shaft, a ratchet gear fixed to the opposite end of said second shaft, a resilient finger operated lever hinged to said second shaft and frame, means for imparting intermittent rotary movement through said finger operated lever and transmission connections to said first named shaft and rollers, and means for adjusting the movement of said finger operated lever to fixed limits.

3. The combination in a drafting instrument of a shaft having rollers fixed to its opposite ends, a frame and straight edge pivoted to said shaft, a second frame supporting a transversely disposed shaft pivotally mounted on the first frame, a fixed ratchet gear and a hinged ratchet lever connected to said transversely disposed shaft, a plurality of ratchet pawls differentially adjusted to said ratchet gear, a plurally branched common spring actuating said ratchet pawls, an adjustable finger actuated lever for transmitting intermittent rotary movement to said first named shaft and rollers, means for holding the helical gears engaged under spring tension, and means for tilting said second frame with its shaft and gear out of engagement with the gear on the first named shaft.

Signed in the presence of two subscribing witnesses.

HALVOR OLSEN EIANE.

Witnesses:
  INGRID ESPEDAL,
  BERTHA ESPEDAL.